June 11, 1946. W. H. HUNTER 2,401,935
PROPELLER BLADE PROTECTIVE MEANS
Filed Dec. 6, 1940 2 Sheets-Sheet 1
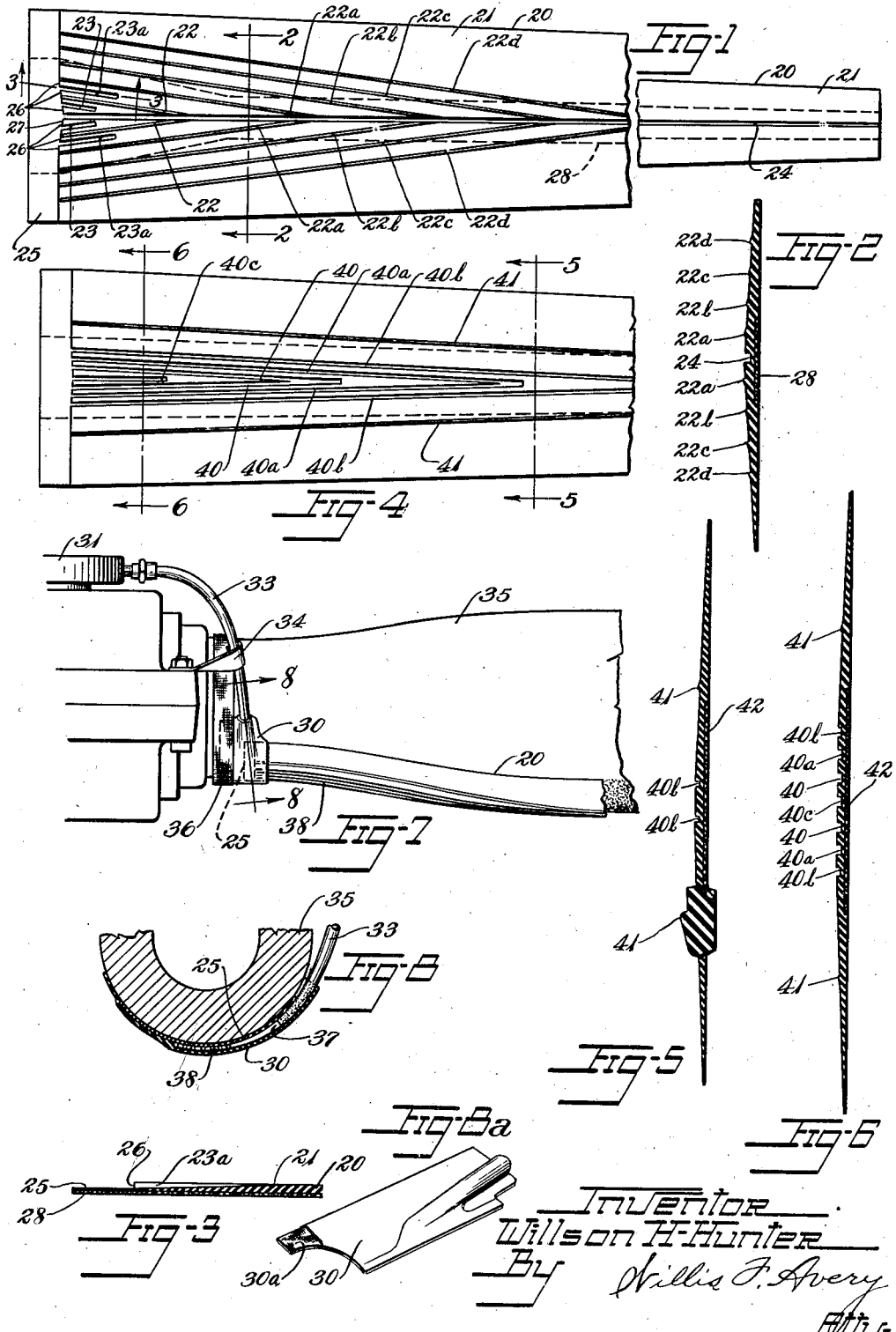

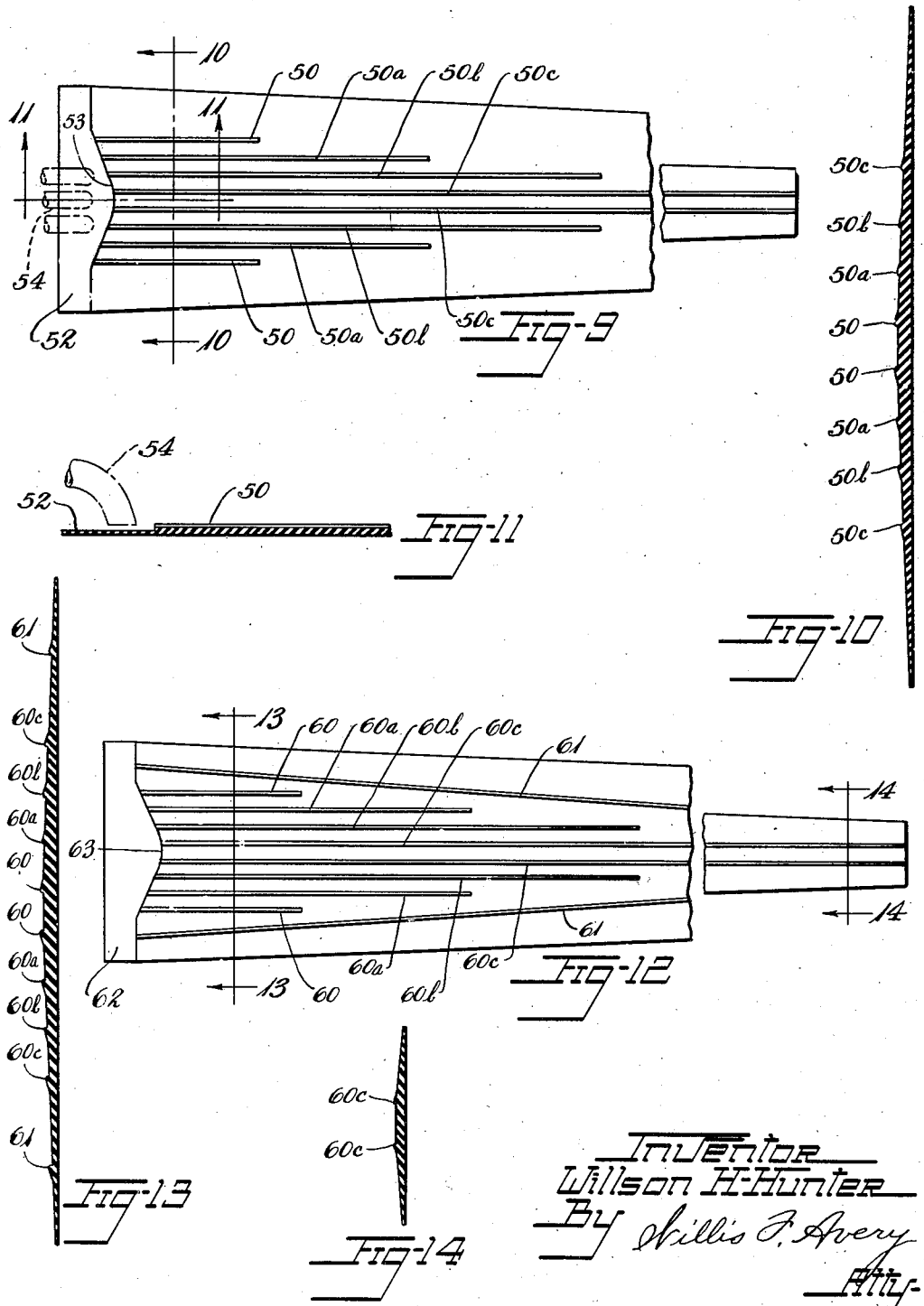

Patented June 11, 1946

2,401,935

UNITED STATES PATENT OFFICE 2,401,935

PROPELLER BLADE PROTECTIVE MEANS

Willson H. Hunter, Akron, Ohio, assignor to The B. F. Goodrich Company, New York, N. Y., a corporation of New York Application December 6, 1940, Serial No. 368,850

19 Claims. (Cl. 244—134)

In the copending application of John F. Morse and Myron L. Taylor, Serial No. 264,575, filed March 28, 1939, there are disclosed anti-freeze feeding shoe constructions for the purpose of conducting the liquid from the root of the propeller blade along the leading edge to zones radially outward thereof for distribution of the liquid in a more desirable fashion than has been effected heretofore where the liquid has been merely deposited upon the surface of the blade at the root portion thereof.

In accordance with the present invention I provide further improved feed shoe constructional features capable of effecting still better distribution of the liquid along the blade and preventing waste of the liquid.

The chief objects of this invention are to provide for more effectively conducting and distributing anti-freeze liquid along the blade to the end of loosening and removing ice along the same or preventing ice accumulation, and to provide for conducting the liquid along the leading edge of the blade to regions thereof where the greatest tendency is found for ice to accumulate.

Other objects are to provide anti-freeze liquid conducting means for propeller blades with a minimum of aerodynamic losses while maintaining dynamic balance in the propeller structure; to provide abrasion protection for blades; to provide for reduction or elimination of waste of anti-freeze liquid; to provide a light-weight and strong structure, and to provide for economy and convenience of manufacture and assembly.

These and further objects will be apparent from the following description, reference being had to the accompanying drawings, in which:

Fig. 1 is a plan view of a covering element before being mounted on a blade, constructed in accordance with and embodying the invention, part being broken away.

Fig. 2 is a section on an enlarged scale taken along the line 2—2 of Fig. 1.

Fig. 3 is a section on an enlarged scale taken along the line 3—3 of Fig. 1.

Fig. 4 is a view like Fig. 1 but of a modified form of covering element, part being broken away.

Fig. 5 is a section on an enlarged scale taken along the line 5—5 of Fig. 4, a part being magnified.

Fig. 6 is a section on an enlarged scale taken along the line 6—6 of Fig. 4.

Fig. 7 is a plan view of parts of a propeller hub and blade with the covering element of Fig. 1 applied thereto.

Fig. 8 is a section on an enlarged scale taken along the line 8—8 of Fig. 7.

Fig. 8a is a perspective view of the liquid-feeding adapter prior to its application to the propeller blade.

Fig. 9 is a view like Fig. 1 but of a further modified form of covering element, part being broken away.

Fig. 10 is a section on an enlarged scale taken along the line 10—10 of Fig. 9.

Fig. 11 is a section on an enlarged scale taken along the line 11—11 of Fig. 9.

Fig. 12 is a view like Fig. 1 but of a still further modified form of covering element, part being broken away.

Fig. 13 is a section on an enlarged scale taken along the line 13—13 of Fig. 12.

Fig. 14 is a section on an enlarged scale taken along the line 14—14 of Fig. 12.

In accordance with the invention, a covering element 20 adapted to be disposed over the leading edge of a propeller blade is shown in the preferred form in Figs. 1 and 2 of the drawings, and comprises a body of rubber-like material having a main surface 21 to provide the desired aerodynamic contour of the assembled element and blade. The covering element has a plurality of pairs of anti-freeze liquid directing ribs 22, 22a, 22b, 22c, 22d, raised with respect to said surface, a plurality of liquid conducting grooves 23, 23a nearer to the center line of the leading edge than the ribs, and depressed with respect to said surface, and a medially disposed liquid conducting groove 24 likewise depressed with respect to said surface. The covering element is preferably constructed of such a length as to extend along the portion of the leading edge of a propeller blade where a tendency has been found for ice to accumulate objectionably. This portion is usually found about two-thirds of the leading edge from the hub end of the blade, but the covering element may extend the full length of the blade or any desired portion thereof. Further, the covering may be adapted to encase the blade partially as shown, or to encase the blade completely if desired.

The medially disposed groove 24 conducts antifreeze liquid the entire length of the covering element. The ribs 22, 22a, 22b, 22c, 22d, are desirably disposed in such a manner as to direct the flow of the liquid reaching them in a course radially outward of the blade and inward to the medial groove 24 at positions along the same. The ribs 22, 22a, 22b, 22c, and 22d tend to retain the liquid on the leading edge of the blade and reduce or eliminate waste, while permitting some of the liquid to flow over the outermost ribs 22d, which is desirable to combat any tendency for ice to accumulate on the side of the blade especially at or near the root portion where the effect of centrifugal force in removing ice is less available.

The ribs 22, 22a, 22b, 22c and 22d may be of gradually reduced height in the radially outward direction if desired in accordance with the reduced depth of liquid where the effect of centrifugal force is more available and the velocity of flow of liquid is thereby increased, to the ends that the amount of spilling over the ribs will be more nearly uniform throughout the extent of the ribs, and the aerodynamic efficiency of the structure will be improved.

The anti-freeze liquid, that is retained by the ribs, is forced outwardly on the blade by the centrifugal force of the rotating propeller and is held at the leading edge of the blade and directed inwardly toward the medial groove 24 by the converging ribs 22, 22a, 22b, 22c, 22d.

The medial groove 24 preferably extends the entire length of the covering element, although it may terminate at any point desired beyond the point where the outermost of the ribs 22d, 22d converge medially. The groove 24 is desirably of uniformly tapered width and depth, becoming narrower and shallower outwardly in order that the filling of the groove by the liquid will be maintained substantially constant as the centrifugal force and consequently the speed of flow of the liquid increases outwardly on the blade of the rotating propeller. The medial groove 24, fed by the converging ribs 22, 22a, 22b, 22c, 22d provides an adequate quantity of anti-freeze liquid to the extremity of the ice-forming portion of the propeller blade, and provides that the liquid will be distributed effectively along the leading edge of the blade over the ice-forming area.

Short grooves 23, 23a, may be provided at the hub end of the covering element to conduct anti-freeze liquid at the start of its flow. The grooves 23, 23a are of tapered depth as indicated in Fig. 3 and are preferably directed inwardly toward the medial groove 24.

An apron 25 is provided as a surface upon which the liquid may be deposited, thereby preventing undesirable contact of the liquid with the bonding medium between the covering and the blade. The apron 25 is preferably depressed with respect to the main surface 21 providing a shoulder 26 at the juncture of the main surface and apron, which shoulder is useful in controlling the flow of the liquid. At the entrance to the grooves in the shoulder 26 the covering is preferably centrally indented longitudinally as indicated at 27 in a manner such that the flow of liquid is further directed toward the middle of the covering and the center line of the leading edge of the blade, thereby further reducing the possibility of waste of the liquid over the margins of the covering and off the sides of the blade.

The covering element is desirably constructed of a minimum thickness consistent with adequate structural strength, and of a sufficient width to cover the leading edge of a propeller blade and provide that the transversely tapered margins of the covering blend with the desired aerodynamic contour of the blade. The covering element may be of any suitable material as for example wood, metal, etc., but a construction of rubber-like material is preferred because of the low adhesion of ice to rubber-like material and the resilient, impact-absorbing and abrasion-resisting properties of such material. However, if desired, the liquid conducting ribs and grooves may even be provided in the blade proper.

If rubber is applied as the material of the covering element, damaging effects which may possibly result from the acculation of electrical charges due to the dielectric properties of the rubber may be avoided by providing a composite structure comprising a very thin surface layer of non-rubber but rubber-like material and particles of an electrically conductive substance. For example, neoprene and graphite particles dispersed in the neoprene to increase electrical conductivity has been found effective. A preferable construction comprises an underneath layer or body of rubber, an inbetween layer of mixed neoprene and rubber which is desirable for the sake of good union and because of the lower freezing point of neoprene as compared to rubber, and an electrically conductive surface layer as hereinabove stated which may be sprayed or painted or molded or otherwise applied on the covering element, and preferably overlying a portion of the metal of the blade, to provide a suitable conductive connection to the metal of the aircraft.

A reinforcing strip 28 of fabric or other suitable reinforcing material may be incorporated in the construction of the covering element as indicated by the broken lines of Fig. 1 and in Fig. 2. The reinforcing strip 28 may be desirable to prevent tearing of the thin material of the covering element, especially at the bottom of the grooves, when the covering element is removed from the mold and during subsequent handling and assembly. The reinforcing strip is located centrally of the covering element and preferably is considerably narrower than the element so as to leave the margins of the element of readily stretchable material for the purpose of facilitating the fitting of the element to the blade, especially where the latter is of extensively varying contour and requires some stretching or other distortion of the margin of the element to adhere it smoothly to the blade surface.

In addition to more effectively distributing anti-freeze liquid over the leading edge of a propeller blade, a covering element constructed in accordance with the invention provides improved protection for the blade from abrasion by dust, stones, cinders, gravel, etc. The improved abrasion protection is provided by a construction having sufficient width to cover the leading edge of the blade and by the addition of material to the outer surface of the covering in the form of raised ribs to reduce or eliminate the necessity of grooves which have the disadvantage of thinning the material.

A removable liquid-conducting covering element for the blade of a propeller is further advantageous for if the grooves or ribs show wear after a period of service, the covering may be easily replaced at low cost. Further, if the blade is marred by an exceptionally severe contact, the covering may be lifted, the dent or nick repaired and the covering recemented or otherwise readhered to the blade with a minimum of inconvenience.

Also, in accordance with the invention adapter means are provided as shown in Figs. 7, 8 and 8a, for introducing anti-freeze liquid at the hub end of the covering element 20 centrally on the outer surface thereof upon its apron. An element 30, incorporating manifolding means, receives liquid from a slinger ring 31 through a flexible feed tube 33 which may be held by a suitable support as for example a bracket 34, and which permits adjustment of a variable pitch propeller. The element 30 is adapted to be disposed on a portion of the circumference of the blade 35 and is held as by a suitable blade encircling strip 36 of adhesive tape, metal etc., or other holding means. The element 30 and the flexible tube 33 may be molded or otherwise formed of rubber-like material as in the case of the covering element 20, and a tear-resisting and shape-retaining fabric reinforcement 30a may be incorporated at the back of the element 30.

The feed tube 33 is secured in sealed relation underneath the element 30 and the raised manifolding 37 or passage is sealed from the material of the blade by the apron 25 at the root end of a covering element and the feed tube 33 is disposed so that liquid is deposited on the apron 25. The liquid conveyed by the feed tube 33 enters the manifolding 37 between the element 30 and the apron of the covering element, the element 30 being cemented or otherwise adhered to the blade and overlying the apron 25 and a part of the grooved area. The liquid is forced from the manifolding 37 onto the conveying means 38 by centrifugal force.

Manifolding means so constructed provide a light structure and only a negligible amount of objectionable aerodynamic drag. Such means provide an opening only onto the central portion of the covering element, thereby avoiding waste of liquid and preventing the entrance of impurities thereinto. The liquid is prevented from contacting the blade and the bond between the covering element and the blade, and further such a construction contains no corrosive metal parts such for example as a nipple for attaching the feeding tube, and provides good distribution to the conveying means whether such means be grooves, ribs or the preferred combination as hereinabove described.

A modified form of the covering element of the invention is shown in Figs. 4, 5, and 6. This embodiment comprises a plurality of converging grooves 40, 40a, 40b, 40c, preferably paired to meet medially of the covering element, and tapered in a manner to provide zero depth at the points of convergence so as to end flush with the surface of the covering. A plurality of converging ribs 41, 41, two in the form of the invention as shown in Fig. 4, are disposed outwardly of the converging grooves 40, 40a, 40b, 40c. The converging grooves 40, 40a, 40b, 40c conduct anti-freeze liquid along the leading edge of a propeller blade and at the same time direct the flow of liquid toward the center of the covering element and medially of the leading edge of the blade. The converging ribs 41, 41 restrict the flow of that portion of the liquid which flows over the laterally outermost grooves and directs the flow outwardly along the ice-forming portions of the blade and centrally of the leading edge of the blade, while permitting only the amount of liquid required for ice removal on the sides of the blade to flow thereover. The desirable streamline shape of the cross-section of a rib is shown magnified in Fig. 5, but the ribs may be any suitable shape in section as for example semi-circular or triangular. The ribs preferably are of decreasing depth radially outward, as in the case of the first embodiment. The covering element may be centrally reinforced by providing a strip 42 as shown.

A further modified form of the invention is shown in Figs. 9, 10 and 11. The modified form as here shown comprises a plurality of liquid directing ribs 50, 50a, 50b, 50c, all disposed substantially parallel and terminating in pairs at desired intervals in a manner to allow flow of liquid over the sides of the leading edge of a propeller blade. Two or more medial ribs extend the length of the covering element, or if desired, that part of the ice-forming area of the blade covered by the element, and thereby conduct a sufficient quantity of liquid along the ice-forming portions to the extremity of such portions.

A still further modified embodiment of the invention is shown in Figs. 12, 13 and 14. Parallel ribs 60, 60a, 60b, 60c, are here disposed substantially as shown in Fig. 9, and a plurality of converging ribs 61, 61, two in the modified form of the invention shown, are disposed in a manner to restrict the flow of anti-freeze liquid over the margins of the leading edge of a propeller blade to the amount required for ice removal and to direct the remainder of the liquid outwardly along the leading edge of the blade and inwardly toward the center of the covering element and the leading edge of the blade in a manner such that a sufficient quantity of liquid is conveyed to the portion of the leading edge of the blade where most critical ice accumulation conditions are usually encountered. The ribs of these embodiments may be of decreasing depth radially outward, as hereinbefore described.

Aprons 52 in Figs. 9 and 11 and 62 in Fig. 12 may be provided in depressed relation to the main surface to receive anti-freeze liquid from manifolding means as hereinabove described, or alternatively liquid may be conducted to an apron by a substantially rigid feed tube 54 as shown in Figs. 9 and 11, such a tube being adapted to conduct liquid from a slinger and may be reinforced by suitable bracket means extending from the propeller hub.

Longitudinally indented portions 53 and 63 in Figs. 9 and 12 of the hub end of the covering element and a projection of the apron 52 and 62 respectively thereinto provide funnel-like means at the shoulder joining the apron with the main surface adapted to urge the flow of liquid from the apron centrally onto the covering element in a manner to reduce a possible tendency for excessive amounts of liquid to flow over the margins of the leading edge of the blade. The indented portions 53 and 63 in the two modified embodiments are especially desirable where liquid is delivered directly to the apron from a feed tube which is fixed in relation to the hub of the propeller. Thus where the propeller is of the variable pitch type, the fixed tube 54 will assume various positions, as indicated in Fig 9, but the indented portions 53 and 63 desirably direct the entrance of the liquid centrally of the covering element.

An anti-freeze liquid conveying system for propeller blades, constructed in accordance with the invention and comprising conveying means incorporated in a suitable protective blade covering and manifolding means for introducing liquid onto the conveying means, combines good ice-prevention with economy of liquid and good protection for the leading edge of the blade against abrasive contacts. The invention further provides for a well-balanced propeller and minimum aerodynamic losses while allowing for economy of materials and convenience of manufacture and assembly.

Variations may be made without departing

I claim:

1. Means for conducting anti-freeze liquid along the leading edge of an aircraft propeller blade, said means comprising a main surface providing the desired aerodynamic contour of the blade and a relatively narrow rib projecting from said surface and extending along the blade in the general direction of the leading edge of the blade for directing liquid radially outward along the leading edge through restraint of the liquid laterally against the side of said rib while the liquid flows longitudinally of said rib, there being a substantially greater width of said main surface at the side of said rib than the width of said rib for bearing the liquid, and means for feeding anti-freeze liquid to said rib.

2. Means for conducting anti-freeze liquid along the leading edge of a propeller blade, said means comprising a main surface at said leading edge and a relatively narrow rib disposed along the blade to one side of the center line of said leading edge and extending radially outward and inward toward said center line in a manner to direct liquid radially outward along said leading edge through restraint of the liquid laterally against the side of said rib while the liquid flows longitudinally of said rib, there being a substantially greater width of said main surface at the side of said rib than the width of said rib for bearing the liquid.

3. A propeller blade protective covering element adapted to be mounted on the leading edge of a propeller blade, said covering element being of a thickness tapering toward the side edges thereof and having a main surface adapted to complete the desired aerodynamic contour of the blade and covering structure when assembled, and rib means raised with respect to and integral with said surface of the covering element and extending along the same in the general direction of the leading edge of the covering element when assembled on the blade for directing anti-freeze liquid radially outward along said leading edge through restraint of the liquid laterally against the side of said rib means while the liquid flows longitudinally thereof, there being a substantially greater width of said main surface at the side of said rib means than the width of said rib means for bearing the liquid.

4. A propeller blade protective covering element of resilient material adapted to be mounted on the leading edge of a propeller blade, said covering element being of a thickness tapering toward the side edges thereof and having a main surface adapted to complete the desired aerodynamic contour of the blade and covering structure when assembled, and a plurality of relatively narrow ribs integral with said covering element and projecting from said main surface and extending different distances along the leading edge of the covering element when assembled on the blade from the root portion thereof for conducting anti-freeze liquid from said root portion radially outward along said leading edge through restraint of the liquid laterally against a side of each rib while the liquid flows longitudinally thereof, there being a substantially greater width of said main surface between said ribs than the width of either rib for bearing the liquid.

5. A propeller blade protective covering element of rubber-like material adapted to be mounted on the leading edge of a propeller blade, said covering element being of a thickness tapering toward the side edges thereof and having a main surface adapted to complete the desired aerodynamic contour of the blade and covering structure when assembled, and means for conducting anti-freeze liquid along the leading edge of the covering element when assembled on the blade, said means comprising a groove in said surface and a plurality of relatively narrow ribs projecting from said surface and extending different distances radially outward thereof and terminating at said groove, said groove extending along the leading edge portion of the covering element in a manner to conduct liquid radially outward along the leading edge from positions at which liquid is directed into said groove by said ribs.

6. A propeller blade protective covering element of rubber-like material adapted to be mounted on the leading edge of a propeller blade, said covering element being of a thickness tapering toward the side edges thereof and having a main surface adapted to complete the desired aerodynamic contour of the blade and covering structure when assembled and exposed means in part depressed in said surface and in part projecting from said surface for conducting anti-freeze liquid along the leading edge of the blade through restraint of the liquid laterally against the sides of said means while the liquid flows longitudinally of the covering element, there being a substantially greater width of said main surface between the depressed part and the projecting part of said means than the width of either of said depressed part or said projecting part.

7. A propeller blade protective covering element of rubber-like material adapted to be mounted on the leading edge of a propeller blade, said covering element being of a thickness tapering toward the side edges thereof and having a main surface adapted to complete the desired aerodynamic contour of the blade and covering structure when assembled and means in part depressed in said surface and in part projecting from said surface for conducting anti-freeze liquid along the leading edge of the covering element when assembled on the blade, said means comprising a plurality of liquid-conducting grooves in said surface of the covering element, said grooves being of tapered depth radially outward and converging from points on each side of the center line of the leading edge to spaced-apart positions radially outward along the same on said center line, and a plurality of relatively narrow ribs raised above said surface and disposed transversely outward of the grooves and extending radially outward and inward toward the center line of the leading edge of the blade in a manner to direct liquid along the same and transversely inward to the liquid-conducting grooves.

8. Means for conducting anti-freeze liquid along the leading edge of an aircraft propeller blade, said means comprising a main surface providing the desired aerodynamic contour of the blade and a relatively narrow rib on said surface extending along the blade in the general direction of the leading edge of the blade and to one side of the center line thereof for directing liquid from the root portion of the blade radially outward along the leading edge through restraint of the liquid laterally against the side of said rib while the liquid flows longitudinally of said rib, there being a substantially greater width of said main surface at the side of said rib than the width of said rib, for bearing the liquid, and means for feeding anti-freeze liquid to said rib at said root portions.

9. Apparatus for conducting anti-freeze liquid along the leading edge of a propeller blade, said apparatus comprising a covering element adapted to be mounted on the leading edge of the blade, said covering element having a main surface adapted to complete the desired aerodynamic contour of the blade and covering element when assembled, means for conducting anti-freeze liquid along the leading edge of the covering element from its root portion when assembled on the blade, and a liquid-receiving apron at the root portion of the covering element depressed with respect to said main surface and in communication with the conducting means on said surface.

10. Apparatus for conducting anti-freeze liquid along the leading edge of a propeller blade, said apparatus comprising a covering element adapted to be mounted on the leading edge of the blade, said covering element having a main surface adapted to complete the desired aerodynamic contour of the blade and covering element when assembled, means comprising a groove in said surface for conducting anti-freeze liquid along the leading edge of the covering element from its root portion when assembled on the blade, and a liquid-receiving apron at the root portion of the covering element depressed with respect to said main surface and in communication with said groove.

11. Apparatus for conducting anti-freeze liquid along the leading edge of a propeller blade, said apparatus comprising a covering element adapted to be mounted on the leading edge of the blade, said covering element having a main surface adapted to complete the desired aerodynamic contour of the blade and covering element when assembled, means comprising a rib raised with respect to said surface for conducting anti-freeze liquid along the leading edge of the covering element from its root portion when assembled on the blade, and a liquid-receiving apron at the root portion of the covering element depressed with respect to said main surface and in communication with said rib.

12. Apparatus for conducting anti-freeze liquid along the leading edge of a propeller blade, said apparatus comprising a covering element adapted to be mounted on the leading edge of the blade, said covering element having a main surface adapted to complete the desired aerodynamic contour of the blade and covering element when assembled, means comprising grooves in said surface and ribs raised with respect to said surface for conducting anti-freeze liquid along the leading edge of the covering element from its root portion when assembled on the blade, and a liquid-receiving apron at the root portion of the covering element depressed with respect to said main surface and in communication with said grooves and ribs.

13. Apparatus for conducting anti-freeze liquid along the leading edge of a propeller blade, said apparatus comprising a covering element adapted to be mounted on the leading edge of the blade, said covering element having a main surface adapted to complete the desired aerodynamic contour of the blade and covering element when assembled, means for conducting anti-freeze liquid along the leading edge of the covering element from its root portion when assembled on the blade, and a liquid-receiving apron at the root portion of the covering element depressed with respect to said main surface and in communication with the conducting means on said surface, said main surface joining said apron in a shoulder, and said shoulder being indented in a manner providing a funnel-like structure for introducing the liquid from the apron to the conducting means of said surface.

14. Apparatus for conducting anti-freeze liquid along the leading edge of a propeller blade, said apparatus comprising a covering element adapted to be mounted on the leading edge of the blade, said covering element having a main surface adapted to complete the desired aerodynamic contour of the blade and covering element when assembled, means for conducting anti-freeze liquid along the leading edge of the covering element from its root portion when assembled on the blade, said covering element having a liquid-receiving apron at the root portion of the covering element depressed with respect to the main surface and joining said main surface in a shoulder, said apron being in communication with the conducting means on the main surface by means of at least one groove through said shoulder, and said shoulder being indented in a manner providing a funnel-like structure for introducing the liquid from the apron to the conducting means of said surface through said groove.

15. Apparatus for conducting anti-freeze liquid along the leading edge of a propeller blade, said apparatus comprising a covering element of rubber-like material adapted to be mounted on the leading edge of the blade, said covering element having a main surface adapted to complete the desired aerodynamic contour of the blade and covering element when assembled, means for conducting anti-freeze liquid along the leading edge of the covering element from its root portion when assembled on the blade, and a liquid-receiving apron at the root portion of the covering element depressed with respect to said main surface and in communication with the conducting means on said surface.

16. Apparatus for conducting anti-freeze liquid along the leading edge of a propeller blade, said apparatus comprising a covering element adapted to be mounted on the leading edge of the blade, said covering element having a main surface adapted to complete the desired aerodynamic contour of the blade and covering structure when assembled, means associated with said surface for conducting anti-freeze liquid along the leading edge of the same from its root portion when assembled on the blade, an apron portion at the root portion of the covering element depressed with respect to said main surface, and in communication with said means thereon, and means for conducting liquid onto said apron portion comprising an element adapted to be mounted upon the root portion of the blade in overlying relation with respect to said apron portion and comprising conduit means therein for conducting fluid onto said apron portion.

17. Means for conducting anti-freeze liquid along the leading edge of an aircraft propeller blade, said means comprising a main surface at said leading edge and at least one exposed rib extending along said leading edge and of gradually reduced height in the radially outward direction for directing liquid radially outward along the leading edge through restraint of the liquid laterally against the side of said rib while the liquid flows longitudinally of said rib, there being a substantially greater width of said main surface at the side of said rib than the width of said rib for bearing the liquid.

18. A propeller blade protective covering element of resilient material adapted to be mounted on the leading edge of a propeller blade, said covering element being of a thickness tapering toward the side edges thereof and having a main surface adapted to complete the desired aerodynamic contour of the blade and covering structure when assembled, and means associated with said covering element for conducting anti-freeze liquid along the leading edge of the blade, said means comprising at least one rib raised with respect to said main surface and extending along the leading edge and of gradually reduced height in the radially outward direction for restraining the liquid laterally against the side of said rib while the liquid flows longitudinally of said rib, there being a substantially greater width of said main surface at the side of said rib than the width of said rib for bearing the liquid.

19. Apparatus for conducting anti-freeze liquid along the leading edge of a propeller blade, said apparatus comprising a covering element adapted to be mounted on the leading edge of the blade, said covering element having a main surface adapted to complete the desired aerodynamic contour of the blade and covering element when assembled and said covering element having a liquid-receiving apron portion at the root end, and at least one relatively narrow rib raised with respect to said main surface for directing anti-freeze liquid along the leading edge of the covering element when assembled on the blade, said rib terminating short of the end of the covering element at said apron.

WILLSON H. HUNTER.